United States Patent [19]

Morimoto et al.

[11] 3,876,730

[45] Apr. 8, 1975

[54] PROCESS FOR PRODUCING BINARY OR TERNARY GRAFT-COPOLYMER

[75] Inventors: Masayoshi Morimoto; Tetsutaro Sanjiki; Hideki Horiike; Takeo Oyamada, all of Ichihara, Japan

[73] Assignee: Sumitomo Chemical Company, Limited, Osaka, Japan

[22] Filed: Jan. 29, 1973

[21] Appl. No.: 327,316

[30] Foreign Application Priority Data

Jan. 31, 1972 Japan.................................. 47-11727

[52] U.S. Cl............................ 260/878 R; 260/878
[51] Int. Cl............................................. C08f 15/00
[58] Field of Search ................................. 260/878 R

[56] References Cited
UNITED STATES PATENTS

| | | | |
|---|---|---|---|
| 3,538,190 | 11/1970 | Meredith et al. | 260/878 R |
| 3,538,191 | 11/1970 | Meredith et al. | 260/878 R |
| 3,538,192 | 11/1970 | Bishop | 260/878 R |
| 3,538,193 | 11/1970 | Meredith et al. | 260/878 R |
| 3,642,950 | 2/1972 | O'Shea | 260/878 R |
| 3,657,395 | 4/1972 | Meredith et al. | 260/878 R |
| 3,671,608 | 6/1972 | Meredith et al. | 260/878 R |
| 3,683,050 | 8/1972 | Meredith et al. | 260/878 R |

Primary Examiner—Joseph L. Schofer
Assistant Examiner—A. Holler
Attorney, Agent, or Firm—Stevens, Davis, Miller & Mosher

[57] ABSTRACT

A binary or ternary graft-copolymer excellent in both tensile strength and impact resistance is obtained by the process for producing a binary or ternary graft-copolymer consisting essentially of an ethylene-propylene rubber and an aromatic vinyl compound or of an ethylene-propylene rubber, an aromatic vinyl compound, and a vinyl cyanide compound, characterized by subjecting these materials to solution polymerization in a mixed solvent comprising an aliphatic hydrocarbon solvent capable of dissolving the ethylene-propylene rubber and a polar solvent capable of dissolving a poly-(aromatic vinyl compound) or a copolymer of the aromatic vinyl compound and the vinyl cyanide compound.

13 Claims, No Drawings

PROCESS FOR PRODUCING BINARY OR TERNARY GRAFT-COPOLYMER

This invention relates to a process for producing a thermoplastic resin excellent in impact resistance. More particularly, this invention relates to a solution-polymerization process for producing a binary or ternary graft-copolymer consisting essentially of an ethylene-propylene rubber and an aromatic vinyl compound or of an ethylene-propylene rubber, an aromatic vinyl compound, and a vinyl cyanide compound.

It has hitherto been attempted to develop a process for producing a graft-copolymer excellent in both impact resistance and weather resistance by graft-copolymerizing styrene or styrene and acrylonitrile onto an ethylene-propylene rubber, in view of the fact that the ethylene-propylene rubber is excellent in weather resistance. Most of such processes has hitherto been known utilized a bulk polymerization technique (U.S. Pat. No. 3,538,192) or an emulsion polymerization technique (U.S. Pat. No. 3,435,096), though a solution polymerization technique has been used in some cases (U.S. Pat. No. 3,538,190).

However, although the graft-copolymers obtained by the above processes have a weather resistance equal to or higher than that of, for example, an ABS resin due to the ethylene-propylene rubber used as a rubber component, there still remains such problems that the impact resistance of said graft-copolymers is generally inferior to that of an ABS resin, and even when there has been obtained, on rare occasions, a graft-copolymer having an improved impact strength, such a copolymer is inferior in tensile strength.

The present inventors achieved this invention as a result of extensive studies to develop a graft-copolymer excellent in both impact resistance and tensile strength by use of an ethylene-propylene rubber as a rubber component.

An object of this invention is to provide a novel process for producing a well-balanced graft-copolymer having an excellent tensile strength and impact resistance by binary or ternary graft-copolymerization from an ethylene-propylene rubber and an aromatic vinyl compound, or from an ethylene-propylene rubber, an aromatic vinyl compound, and a vinyl cyanide compound.

Another object of this invention is to provide by the aforesaid process a binary or ternary graft-copolymer excellent in both tensile strength and impact strength, and consisting essentially of an ethylene-propylene rubber and an aromatic vinyl compound or of an ethylene-propylene rubber, an aromatic vinyl compound, and a vinyl cyanide compound.

Other objects of this invention will become apparent from the following explanation and the description in appended claims.

The objects of this invention may be achieved by subjecting an ethylene-propylene rubber and an aromatic vinyl compound or an ethylene-propylene rubber, an aromatic vinyl compound and a vinyl cyanide compound to solution polymerization to form a binary or ternary graft-copolymer in a mixed solvent comprising an aliphatic hydrocarbon solvent capable of dissolving the ethylene-propylene rubber and a polar solvent capable of dissolving a poly-(aromatic vinyl compound) in the case of the binary graft-copolymer, or of dissolving a copolymer of the aromatic vinyl compound and the vinyl cyanide compound in the case of the ternary graft-copolymer.

According to the process of this invention, there may be obtained a graft-copolymer which is well-balanced in impact resistance and tensile strength, and which has favorable properties such as excellent extrudability and excellent surface gloss of the shaped articles. Moreover, the said process is characterized in that, as compared with a conventional process, the rate of graft-copolymerization is markedly higher, the content of acetone-insoluble portion (a value proportional to the conversion in grafting) is higher, and the molecular weight of acetone-soluble portion (the main constituent being, for example, an acrylonitrile-styrene copolymer) is relatively large. The process has a further advantage in that by varying the ratio between an aliphatic solvent and a polar solvent, it is possible to control unrestrictedly the rate of polymerization and the molecular weight of the graft-copolymer.

The ethylene-propylene rubbers, as herein referred to, include not only two-component polymers (hereinafter referred to as EPM) comprising ethylene and propylene, but also ethylene-propylene-diene terpolymers (hereinafter referred to as EPDM) containing as a third component such a diene as dicyclopentadiene, ethylidenenorbornene, 1,4-hexadiene, 1,3-cyclooctadiene, 1,5-hexadiene, 1,7-octadiene, or 1,4-pentadiene. An ethylene-propylene rubber comprising ethylene and propylene in a molar ratio of 5 : 1 to 1 : 2 is preferably used. In the case of EPDM, a preferred proportion of a diene component is 4 to 50 in terms of iodine value. It is also possible to use the ethylene-propylene rubber in combination with one or more of other rubbers; for instance, it is possible to use as a rubber component a blend of EPDM or EPM with one or more of polybutadiene, polyisoprene, and styrene-butadiene rubber. The blend of these different rubbers can be suitably selected according to the purpose. However, when the purpose is to secure weather resistance, proportion of the ethylene-propylene rubber in the rubber component is greater the better; for example, a preferred proportion is within the range from 50 to 100 % by weight.

The aromatic vinyl compounds for use are styrene, α-methylstyrene, α-chlorostyrene, and dimethylstyrene; among these, styrene is used preferably. As a vinyl cyanide compound, may be used acrylonitrile and methacrylonitrile.

The weight ratio of these vinyl compounds to the rubber can be suitably selected according to the purpose. Ordinarily, 5 to 20 % by weight of a rubber component is used for 95 to 80 % by weight of a vinyl compound monomer. When a graft-copolymer is produced for the purpose of improving compatibility with other rubbers or resins, it is preferable for increasing the degree of grafting to make weight ratio of the rubber component to the vinyl monomer as large as possible; for example, a suitable proportion of the rubber component is within the range from 20 to 90 % by weight based on vinyl monomers.

In the case of a ternary graft-copolymer where an aromatic vinyl compound and a vinyl cyanide compound are used, the weight ratio of both compounds is adjusted within the range from 2 : 1 to 5 : 1; for example, in a graft-copolymer involving styrene and acrylonitrile, a weight ratio of 70 : 30 to 75 : 25 is most suitable.

The aliphatic hydrocarbon solvents, as referred to in this invention, should dissolve the ethylene-propylene rubber. Examples of such solvents include paraffins and cycloparaffins having 5 to 10 carbon atoms, such as pentane, n-hexane, 3-methylpentane, 2-methylpentane, 2,2- and 2,4-dimethylpentane, heptane, cyclopentane, cyclohexan; cyclopentane and cyclohexane having alkyl substituents of 1 to 4 carbon atoms.

The polar solvents to be used in this invention may or may not dissolve an ethylene-propylene rubber, but should dissolve at least a poly-(aromatic vinyl compound) or a copolymer of an aromatic vinyl compound and a vinyl cyanide compound. Examples of suitable polar solvents include ketones such as acetone, methyl ethyl ketone, methyl n-propyl ketone, diethyl ketone, 2-hexanone, 3-hexanone, acetophenone, and propiophenone; esters such as methyl formate, ethyl formate, methyl acetate, ethyl acetate, n-propyl acetate, n-butyl acetate, n-amyl acetate, methyl propionate, and methyl n-butyrate; ethers such as tetrahydrofuran and dioxane; chlorine-substituted aliphatic hydrocarbons such as dichloroethane and chloroform; nitrogen-containing hydrocarbons such as pyridine, aniline, acetonitrile, and dimethylformamide; and sulfur-containing hydrocarbons such as dimethyl sulfoxide.

The solubility of a polymer in a solvent was qualitatively judged in the following manner: A solvent was added to a polymer in an amount 10 times the weight of the latter at 25°C. and the mixture was left standing for 24 hours; on inspection of the mixture, the polymer was assumed to be dissolved when the mixture had formed a homogeneous phase or when the degree of swelling of the polymer had exceeded 200 % even if the mixture had formed a heterogeneous phase.

Each one or more solvents selected from the above-mentioned two groups of solvents are used as polymerization media in this invention. For example, a solvent system comprising one or more of the above-noted aliphatic hydrocarbon solvents and one or more of the above-noted polar solvents may be used. A mixed solvent comprising 5 to 95 % by weight of an aliphatic hydrocarbon solvent and 95 to 5 % by weight of a polar solvent is ordinarily used. It is also possible to use only an aliphatic hydrocarbon solvent in an initial stage of polymerization and add a polar solvent during progress of the polymerization. Best results are obtained particularly by using at the beginning of polymerization an aliphatic hydrocarbon solvent containing 0 to 20 % by weight of a polar solvent and adding the polar solvent as the polymerization proceeds until the solvent system will contain in the final stage of polymerization 30 to 80 %, preferably 40 to 60 %, by weight of the polar solvent. The rate of polymerization, the state of dispersion of rubber, and the molecular weight of acetone-soluble portion in the graft-copolymer can be freely controlled by regulating timing and quantity in adding a polar solvent as the polymerization proceeds. As the amount of the polar solvent increases, the rate of polymerization as well as the molecular weight of acetone-soluble portion tend to decrease.

The catalysts to be used in the graft polymerization are common radical polymerization catalysts. Examples of suitable catalysts include peroxides such as benzoyl peroxide, lauroyl peroxide, di-tert-butyl peroxide, acetyl peroxide, tert-butyl peroxybenzoate, dicumyl peroxide, peroxybenzoic acid, tert-butylperoxypivalate and peroxyacetic acid, and diazocompounds such as azobisisobutyronitrile.

In this invention, the catalyst can be added in portions. As compared with the addition of a radical catalyst all at one time at the beginning of polymerization, the portionwise addition of the radical catalyst has such advantages as acceleration of polymerization, reduction in polymerization time and improvement in physical properties of the end product. The vinyl monomer is added preferably also in portions, because it is possible, in this case, to obtain a polymer with a higher degree of grafting and having superior physical properties as compared with the case of adding as a whole.

The catalyst is used in an amount of 0.1 to 10 % by weight on a vinyl compound monomer. The suitable polymerization temperature is 50° to 120°C. The polymerization time depends to a great extent on polymerization conditions, and it is desirably controlled so that conversion may reach 90 % or higher in 5 to 25 hours.

After completion of polymerization, the reaction mixture is poured with high-speed agitation into a lower alcohol such as methanol or ethanol to separate a graft polymer in the form of powder. The separated polymer is air-dried and finally dried in vacuo at 100° to 150°C. for several hours. The dried polymer is formed into pellets of suitable size by means of a pelletizer.

The graft-copolymer obtained according to this invention has a high tensile strength and an excellent impact resistance. A graft-copolymer obtained by the conventional process using n-hexane as the polymerization solvent shows a microstructure, in which a microphase-separation has occurred between the rubber component and other components, the interface of the two phases forming a distinctive boundary between them, whereas the graft-copolymer obtained by the process of this invention using a mixed solvent as the polymerization medium shows a microstructure, in which the interface forms an indistinctive boundary. This fact seems to be the reason for improvements in dispersion of the rubber in the graft copolymer of this invention and in impact resistance of the graft copolymer. Further, the graft copolymer of this invention has a high tensile strength which is in harmony with its excellent impact resistance.

The invention is illustrated below in detail with reference to Examples, but the scope of the invention is not limited thereto.

EXAMPLE 1

Into a 2-liter separable flask provided with a Dimroth condenser, a thermometer, a glass tube for bubbling a gas, a Hopkins cooler and a stirring shaft with two turbine-type stirring blades, were charged 50 g of EPDM having an iodine value of 18.7, a Mooney viscosity of 40, a propylene content of 34.7 % by weight, and ethylidenenorbornene as a diene component, and 550 g of n-hexane. After thorough dissolution, to the resulting solution, were added 300 g of styrene, 100 g of acrylonitrile and 2.4 g of benzoyl peroxide diluted with 50 g of n-hexane. Polymerization was allowed to proceed under an atmosphere of argon at 70°C. while stirring with a stirrer revolving at 600 r.p.m. When conversion reached about 15 %, 600 g of ethyl acetate was added dropwise and the polymerization was carried out for 15 hours. After completion of the reaction, the graft-polymerization mixture was poured into 5 liters of methanol to separate the polymer as a precipitate, which was dried under reduced pressure at 150°C. for 3 hours to obtain a graft-copolymer, 12.7% by weight in rubber content. The copolymer was milled on a roll mill, 7 inches $\phi \times 16$ inches, at 170°C. for 10 minutes, and pressed at 200°C. for 10 minutes to prepare a sheet. Dumb-bell-shaped test specimens, JIS Pattern No. 3, were tested for tensile strength at room temperature and at a stretching speed of 5 mm/minute, and Izod impact strength according to ASTM D 256–56. The results obtained were as follows:

Tensile strength: 520 kg/cm$^2$
Notched Izod impact strength: 14 kg·cm/cm$^2$

EXAMPLE 2

Polymerization was carried out for 15 hours in the same manner as in Example 1, except that a mixed solvent comprising 360 g of n-hexane and 840 g of ethyl acetate was used. A graft-copolymer, 13.2 % in rubber content, was obtained, the physical properties of which were as shown below.

Tensile strength: 503 kg/cm$^2$
Notched Izod impact strength: 24.0 kg·cm/cm$^2$

EXAMPLE 3

In the same polymerizer as used in Example 1, were charged 50 g of EPDM having an iodine value of 9.7, a Mooney viscosity of 98, a propylene content of 43.5 % by weight, and dicyclopentadiene as a diene component, and 550 g of n-hexane. After thorough dissolution, to the resulting solution were added 300 g of styrene, 100 g of acrylonitrile and 4.0 g of benzoyl peroxide diluted with 50 g of n-hexane. Polymerization was allowed to proceed under an atmosphere of argon at 70°C. While stirring with a stirrer revolving at 600 r.p.m. When conversion reached about 15 %, 600 g of ethylene dichloride was added dropwise and the polymerization was carried out for 32 hours. After completion of the reaction, the graft-polymerization mixture was poured into 5 liters of methanol to separate the resulting precipitate which was dried under reduced pressure at 150°C. for 3 hours to obtain a graft-copolymer, 13.3 % by weight in rubber content. Physical properties were measured in the same manner as in Example 1 to obtain the results as shown below.

Tensile strength: 536 kg/cm$^2$
Notched Izod impact strength: 12.6 kg·cm/cm$^2$

EXAMPLE 4

The graft-copolymer obtained by the process of this invention has a markedly improved impact strength as compared with that of a graft-copolymer obtained by a known process (U.S. Pat. No. 3,538,190) using n-hexane alone or a mixture of n-hexane and toluene. Examples of mixing ratios by weight of n-hexane and ethyl acetate in mixed solvents relative to elongation, impact strength and tensile strength of the graft-copolymer are shown in Table 1.

These experiments were conducted following the procedure of Example 1, and only the solvent composition was varied, the rubber content of the graft-copolymer having been regulated to be within the range of 12 to 14 % by weight. Elongation was measured according to the method specified in JIS K 6301.

Table 1

| Run No. | Solvent system (% by weight) | | Elongation (%) | Notched Izod impact strength (kg·cm/cm$^2$) | Tensile strength (kg/cm$^2$) | Remark |
|---|---|---|---|---|---|---|
| 1 | n-Hexane | 100 | 7.2 | 8.7 | 523 | Comparative Example |
|   | Ethyl acetate | 0 | | | | |
| 2 | n-Hexane | 70 | 8.0 | 10.6 | 526 | Example |
|   | Ethyl acetate | 30 | | | | |
| 3 | n-Hexane | 50 | 19.8 | 14.3 | 520 | do. |
|   | Ethyl acetate | 50 | | | | |
| 4 | n-Hexane | 40 | 9.6 | 21.2 | 458 | do. |
|   | Ethyl acetate | 60 | | | | |
| 5 | n-Hexane | 30 | 1.2 | 24.0 | 375 | do. |
|   | Ethyl acetate | 70 | | | | |
| 6* | n-Hexane | 50 | 7.0 | 3.2 | 530 | Comparative Example |
|   | Toluene | 50 | | | | |

* A process described in U.S. Patent 3,538,190.

What is claimed is:

1. A process for producing a binary or ternary graft-copolymer consisting essentially of an ethylene-propylene rubber and an aromatic vinyl compound or of an ethylene-propylene rubber, an aromatic vinyl compound and a vinyl cyanide compound, the ethylene-propylene rubber comprising ethylene and propylene in a molar ratio of 5 : 1 to 1 : 2 and being selected from the group consisting of two-component polymer comprising ethylene and propylene and ethylene-propylene-diene terpolymer containing as a third component a diene selected from the group consisting of dicyclopentadiene, ethylidenenorbornene, 1,4-hexadiene, 1,3-cyclooctadiene, 1,5-hexadiene, 1,7-octadiene or 1,4-pentadiene and a proportion of the diene component being 4 to 50 in terms of iodine value, the aromatic vinyl compound being selected from the group consisting of styrene, α-methylstyrene, α-chlorostyrene, and dimethylstyrene, and the vinyl cyanide compound being selected from the group consisting of acrylonitrile and methacrylonitrile, which comprises subjecting these materials to solution polymerization in the presence of a radical catalyst at a temperature of 50° to 120°C for 5 to 25 hours in a mixed solvent comprising 5 to 95% by weight of an aliphatic hydrocarbon solvent capable of dissolving the ethylene-propylene rubber and 95 to 5% by weight of a polar solvent capable of dissolving a poly-(aromatic vinyl compound) in the case of the binary graft-copolymer or of dissolving a copolymer of the aromatic vinyl compound and the vinyl cyanide compound in the case of the ternary graft-copolymer, the aliphatic hydrocarbon solvent being selected from the group consisting of paraffins and cycloparaffins having 5 to 10 carbon atoms, cyclopentanes having substituent alkyl groups of 1 to 4 carbon atoms, and cyclohexanes having substituent alkyl groups of 1 to 4 carbon atoms, and the polar solvent being selected from the group consisting of ketones, esters, ethers, chlorine-substituted aliphatic hydrocarbons, nitrogen-containing hydrocarbons, and sulfur-containing hydrocarbons.

2. A process according to claim 1, wherein the polar solvent is at least one member selected from the group consisting of acetone, methyl ethyl ketone, methyl n-propyl ketone, diethyl ketone, 2-hexanone, 3-hexanone, acetophenone, propiophenone, methyl formate, ethyl formate, methyl acetate, ethyl acetate, n-propyl acetate, n-butyl acetate, n-amyl acetate, methyl propionate, methyl n-butyrate, tetrahydrofuran, dioxane, dichloroethane, chloroform, pyridine, aniline, acetonitrile, dimethylformamide, and dimethyl sulfoxide.

3. A process according to claim 1, wherein the proportion of the polar solvent in the mixed solvent is 0 to 20 % by weight at the beginning of polymerization, the proportion being increased during the progress of polymerization by addition of fresh polar solvent, and reaches 30 to 80 % by weight at the end of polymerization.

4. A process according to claim 1, wherein a blend of the ethylene-propylene rubber with one or two of polybutadidne, polyisoprene and styrene-butadiene rubbers is used.

5. A process according to claim 4, wherein the blend containing the ethylene-propylene rubber in a proportion of 50 to 100 % by weight is used.

6. A process according to claim 1, wherein the aromatic vinyl compound is styrene.

7. A process according to claim 1, wherein the ratio of the aromatic vinyl compound to the vinyl cyanide compound is from 2 : 1 to 5 : 1 by weight.

8. A process according to claim 1, wherein the aromatic vinyl compound is styrene and the vinyl cyanide compound is acrylonitrile.

9. A process according to claim 8, wherein the ratio of styrene to acrylonitrile is from 70 : 30 to 75 : 25 by weight.

10. A process according to claim 1, wherein the radical catalyst is at least one member selected from the group consisting of benzoyl peroxide, lauroyl peroxide, di-tert-butyl peroxide, acetyl peroxide, tert-butyl peroxybenzoate, dicumyl peroxide, peroxybenzoic acid, peroxyacetic acid, tert-butylperoxypivalate and azobisisobutyronitrile.

11. A process according to claim 1, wherein the polymerization is conducted in the presence of 0.1 to 10 % by weight of a catalyst on the vinyl compound.

12. The process of claim 1 wherein said aliphatic hydrocabon solvent is at least one member selected from the group consisting of pentane, n-hexane, 2-methylpentane, 3-methylpentane, 2,2-dimethylpentane, 2,4-dimethylpentane, heptane, cyclopentane, and cyclohexane.

13. The process of claim 1 wherein 5 to 20% by weight of said ethylene-propylene rubber is used with 95 to 80% by weight of said vinyl compound.

* * * * *